April 6, 1943.  K. MILLER  2,315,808

PRESELECTIVE TRANSMISSION

Filed March 18, 1942

Inventor:
Kay Miller
By McCanna, Wintercorn & Morsbach
Attys

Patented Apr. 6, 1943

2,315,808

UNITED STATES PATENT OFFICE 2,315,808

PRESELECTIVE TRANSMISSION

Kay Miller, Rockford, Ill., assignor to The Atwood Vacuum Machine Company, Rockford, Ill., a copartnership Application March 18, 1942, Serial No. 435,152

15 Claims. (Cl. 74—330)

This invention relates to an improved variable speed power transmission especially designed for use in tractors, tanks, trucks, or the like, but of course suitable for other uses.

The principal object of my invention is to provide a pre-selective transmission, in which a two-way clutch has one disk associated with one gear train and the other disk associated with another gear train, so that when one disk is engaged the other turns idly with its gear train, and vice versa, and gears in the idle train may be shifted readily without clashing before the disk associated with that train is engaged, thus enabling quicker changes in speed virtually without interruption in the transmission of power and permitting the complete control of the transmission by levers so that the ordinary foot pedal can be eliminated.

The invention is illustrated in the accompanying drawing, in which—

Figure 1:
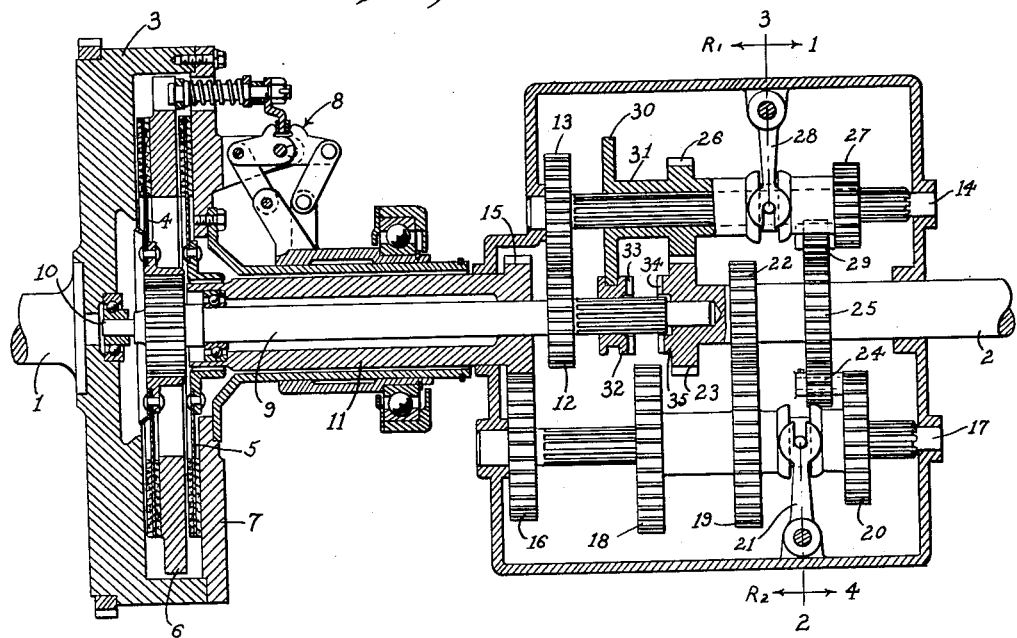
Figure 2:
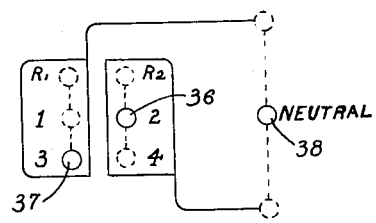

Figure 1 shows more or less diagrammatically a transmission made in accordance with my invention, and Fig. 2 is a gear shift and clutch lever diagram.

In the drawing the reference numeral 1 designates the power input or driving shaft, and 2 the power output or driven shaft. The shaft 1 is indicated as the crankshaft of an internal combustion engine with a flywheel 3 thereon. A two-way clutch of the kind shown in my copending application Serial No. 422,045, filed December 8, 1941, is provided, consisting of two clutch disks 4 and 5 either of which may be engaged to turn with the flywheel 3, according to the position of the pressure plate 6. Forward movement of the pressure plate from a neutral position engages the disk 4 directly with the flywheel, and rearward movement of the plate from a neutral position engages the disk 5 with the back plate 7 to turn with the flywheel. Operating means for the manual control of the pressure plate 6 is indicated at 8, and, as fully described in my copending application, spring means cooperating with clutch actuating levers serve to apply spring pressure to the pressude plate in either direction, the spring means affording substantially constant pressure on the pressure plate in either position of clutch engagement and permitting movement past dead center position of the toggle linkage provided for operating the actuating levers, so that the clutch is automatically maintained in either engaged position under spring pressure until moved manually to neutral position or to the other engaged position.

The intermediate driven shaft 9 for the transmission gearing has the disk 4 splined thereon, and has the usual pilot bearing 10 for supporting the front end thereof at the center of the flywheel 3. 11 is a quill surrounding the shaft 9 and serving as an auxiliary intermediate driven member. The shaft 9 carries a gear 12 on the rear end portion meshing with a gear 13 for driving a countershaft 14. The quill 11 carries a gear 15 on the rear end thereof meshing with a gear 16 for driving another countershaft 17. The driven shaft 2 is arranged to be driven from either countershaft, two low speeds forward and one reverse being obtainable from the countershaft 17, and one speed forward and reverse as well as direct drive being obtainable from the countershaft 14. In other words, there are four speeds forward and two speeds in reverse. A three-gear cluster 18—20 is shiftable in either direction from the position shown by means of the yoke 21. In the position shown the gear 19 transmits forward drive to the driven shaft 2 through the gear 22 meshing with gear 19. However, if the cluster is shifted rearwardly, gear 18 is meshed with gear 23 to transmit forward drive at another speed to the shaft 2, and if the cluster is shifted forwardly to mesh gear 20 with the intermediate idler gear 24 that meshes with the reverse drive gear 25 on the driven shaft 2, a reverse drive is obtained. It is, of course, manifest that each of the two speeds forward and one reverse just mentioned are dependent upon the engagement of the clutch disk 5.

A two-year cluster 26—27 is shiftable in either direction by a yoke 28. In the position shown, gear 26 is in mesh with gear 23 to transmit forward drive to the driven shaft 2, but if the cluster is shifted forwardly to mesh gear 27 with an intermediate idler gear 29 that meshes with the reverse drive gear 25 on the driven shaft 2, a reverse drive is obtained. A flange 30 on the hub 31 of the gear 26 serves to shift a clutch collar 32 to engage its clutch teeth 33 with clutch teeth 34 on the hub 35 of the gear 23 when the cluster 26—27 is shifted rearwardly from the position shown. This results in direct drive. The two speeds forward and one speed in reverse just described are, of course, dependent upon the engagement of the clutch disk 4.

In operation, the desired gears are selected and meshed before the clutch disk associated therewith is engaged and before the other clutch disk is disengaged from an existing speed to pick up the new speed. That is what is meant by the term "preselective." It has long been realized that in the operation of a tractor, for example, the driver cannot shift gears very well on a hill. The same is true of a tank pulling an artillery piece. If the clutch of an ordinary single clutch transmission is disengaged because the speed selected is of a too high ratio, then the tractor or tank, as the case may be, being under load, abruptly comes to a standstill before the lower ratio gears can be meshed and the clutch re-engaged. That difficulty is overcome with the present transmission, and I have, for example, shown the gears 19—22 and 23—26 engaged for a given condition where the driver wants to alternate between these two intermediate speeds. Two gear shift levers will be provided, as indicated diagrammatically at 36 and 37 in Fig. 2, and a clutch lever, as indicated diagrammatically at 38, it being understood of course that the lever 36 serves to operate the yoke 21 and the lever 37 serves to operate the yoke 28, the lever 38 controlling the two-way clutch 4—5. When the clutch disk 4 is engaged, gears 19—22 provide the intermediate speed II, gears 23—26 meanwhile being meshed and in readiness for instantaneous use upon engagement of the clutch disk 5 for the No. III speed. Gears 18—23 are for the No. IV speed in forward, and the teeth 33 on the clutch collar 32 engageable with teeth 34 on the gear 23 being for the No. I speed or direct drive. Gears 20—24—25 provide one reverse drive, designated R2, requiring engagement of clutch disk 4, and the other reverse drive, designated R1, is obtainable through gears 27—29—25 requiring engagement of clutch disk 5.

It is believed the foregoing description conveys a good understanding of the objects and advantages of my invention. The appended claims have been drawn to cover all legitimate modifications and adaptations.

I claim:

1. In a power transmission system, a power input shaft, a power output shaft, telescoping intermediate shafts in coaxial relation to the input and output shafts, a two-way clutch comprising a flywheel driven by the input shaft, two driven disks separately connected to the intermediate shafts and means for selectively engaging either of said disks to turn with the flywheel, two countershafts parallel with the output shaft and separately drivingly connected continuously with the intermediate shafts, driven gears on the output shaft, and pre-selective drive gears cooperating with the last named driven gears for transmitting drive to the output shaft selectively from either countershaft.

2. A power transmission system as set forth in claim 1, including direct drive clutch means for detachably connecting the output shaft with one of the intermediate shafts.

3. A power transmission system as set forth in claim 1, including direct drive clutch means for detachably connecting the output shaft with one of the intermediate shafts, and means operatively associating said clutch means with the pre-selective gears on the countershaft drivingly connected with said intermediate shaft, whereby the output shaft is automatically disconnected from driving relation to said countershaft when said direct drive clutch means is engaged.

4. In a power transmission system, a power input shaft and a power output shaft in coaxial spaced relation, an intermediate shaft in coaxial relation with the aforesaid shafts, a slidable clutch collar on one end of said intermediate shaft movable into and out of engagement with a cooperating clutch collar on the adjacent end of the output shaft, a hollow intermediate shaft surrounding a portion of said first intermediate shaft, two countershafts supported in parallelism with the output shaft with one having a drive gearing connection with the adjacent end of the first intermediate shaft and the other having a drive gearing connection with the adjacent end of the hollow intermediate shaft, driven gears fixed on the output shaft, gear clusters splined on the countershafts for pre-selective engagement with the last named driven gears, one of said clusters being operatively connected with the first mentioned clutch collar so as to be movable therewith and maintain a predetermined relationship thereto, and a two-way clutch for selectively driving either said first intermediate shaft or said hollow intermediate shaft from the input shaft.

5. A power transmission system as set forth in claim 4, wherein one of the driven gears on the output shaft has two idler gears in constant mesh therewith adjacent the countershafts arranged for meshing engagement with the gear clusters on the countershafts for reverse drives.

6. A power transmission system comprising, in combination with input and output shafts disposed in coaxial spaced relation, a pair of countershafts in parallel relation to the output shaft, an intermediate shaft disposed between and in coaxial relation to said input and output shafts, a hollow intermediate shaft surrounding the first intermediate shaft, a two-way clutch for selectively driving either said first intermediate shaft or said hollow intermediate shaft from the input shaft, one of the countershafts being drivingly connected to the first intermediate shaft and the other countershaft being drivingly connected to the hollow intermediate shaft, driven gears on the output shaft and preselective gears on the two countershafts operatively associated with the driven gears for transmitting drive selectively from either countershaft to the output shaft.

7. A power transmission system as set forth in claim 6, including direct drive clutch means for detachably connecting the output shaft with one of the intermediate shafts.

8. A power transmission system as set forth in claim 6, including reverse idler gears meshing with one of the driven gears on the output shaft and arranged to be driven by gears on either of the countershafts.

9. In a power transmission system, a power input shaft, a power output shaft, two intermediate shafts between the input and output shafts, two-way clutch means comprising a driving element driven by the input shaft, two driven elements separately connected to the intermediate shafts, and means for selectively drivingly connecting either of said driven elements to turn with the driving element, two countershafts parallel with the output shaft and separately drivingly connected continuously with the intermediate shafts, driven gears on the output shaft, preselective drive gears cooperating with the last named driven gears for transmitting drive to the output shaft selectively from either countershaft, and direct drive clutch means for detachably connecting the output shaft with one of the intermediate shafts.

10. In a power transmission system, a power input shaft, a power output shaft, two intermediate shafts between the input and output shafts, two-way clutch means comprising a driving element driven by the input shaft, two driven elements separately connected to the intermediate shafts, and means for selectively drivingly connecting either of said driven elements to turn with the driving element, two countershafts parallel with the output shaft and separately drivingly connected continuously with the intermediate shafts, driven gears on the output shaft, pre-selective drive gears cooperating with the last named driven gears for transmitting drive to the output shaft selectively from either countershaft, direct drive clutch means for detachably connecting the output shaft with one of the intermediate shafts, and means operatively associating said clutch means with the pre-selective gears on the countershaft drivingly connected with said intermediate shaft, whereby the output shaft is automatically disconnected from driving relation to said countershaft when said direct drive clutch means is engaged.

11. In a power transmission system, a power input shaft and a power output shaft in coaxial spaced relation, an intermediate shaft in coaxial relation to the aforesaid shafts, a slidable clutch collar on one end of said intermediate shaft movable into and out of engagement with a cooperating clutch collar on the adjacent end of the output shaft, a second intermediate shaft, two countershafts supported in parallelism with the output shaft, one having a drive gear connection with the adjacent end of the first intermediate shaft and the other having a driving connection with the adjacent end of the second intermediate shaft, driven gears fixed on the output shaft, gear clusters splined on the countershafts for pre-selective engagement with the last named driven gears, one of said clusters being operatively connected with the first mentioned clutch collar so as to be movable therewith and maintain a predetermined relationship thereto, and two-way clutch means for selectively driving either the first intermediate shaft or the second intermediate shaft from the input shaft.

12. A power transmission system as set forth in claim 11, wherein one of the driven gears on the output shaft has two idler gears in constant mesh therewith adjacent the countershafts arranged for meshing engagement with the gear clusters on the countershafts for reverse drives.

13. A power transmission system, comprising, in combination with input and output shafts disposed in coaxial spaced relation, a pair of countershafts in parallel relation to the output shaft, an intermediate shaft disposed between and in coaxial relation to said input and output shafts, a second intermediate shaft, two-way clutch means for selectively driving either of said intermediate shafts from the input shaft, one of the countershafts being drivingly connected to the first intermediate shaft and the other countershaft being drivingly connected to the second intermediate shaft, driven gears on the output shaft and pre-selective gears on the two countershafts operatively associated with the driven gears for transmitting drive selectively from either countershaft to the output shaft.

14. A power transmission system as set forth in claim 13, including direct drive clutch means for detachably connecting the output shaft with one of the intermediate shafts.

15. A power transmission system as set forth in claim 13, including reverse idler gears meshing with one of the driven gears on the output shaft and arranged to be driven by gears on either of the countershafts.

KAY MILLER.